United States Patent [19]
Hernandez

[11] Patent Number: 5,400,888
[45] Date of Patent: Mar. 28, 1995

[54] CLUTCH DIAPHRAGM, IN PARTICULAR FOR A MOTOR VEHICLE

[75] Inventor: Georges Hernandez, Paris, France

[73] Assignee: Valeo, Paris, France

[21] Appl. No.: 59,255

[22] Filed: May 12, 1993

[30] Foreign Application Priority Data

May 13, 1992 [FR] France ................... 92 05803

[51] Int. Cl.6 ............................. F16D 13/71
[52] U.S. Cl. .................. 192/89.25; 192/70.27; 267/161
[58] Field of Search ......... 192/89 BL, 89 PH, 89 PL, 192/89 SD, 70.27; 267/161, 163, 181

[56] References Cited

U.S. PATENT DOCUMENTS

| 4,601,376 | 7/1986 | Reik . | |
|---|---|---|---|
| 4,618,047 | 10/1986 | Kinz | 192/89 SD X |
| 4,629,048 | 12/1986 | Draper et al. | 192/89 SD X |
| 4,667,793 | 5/1987 | Kunz et al. | 192/89 SD X |
| 4,747,586 | 5/1988 | Reik | 267/161 |
| 4,770,282 | 9/1988 | Maycock et al. | 192/89 SD X |
| 4,828,092 | 5/1989 | Kohler | 192/89 SD X |

FOREIGN PATENT DOCUMENTS

| 2583484 | 12/1986 | France | 192/89 B |
|---|---|---|---|
| 1549247 | 7/1979 | United Kingdom . | |
| 2158183 | 11/1985 | United Kingdom | 192/89 B |
| 2164105 | 3/1986 | United Kingdom . | |

*Primary Examiner*—Richard M. Lorence
*Attorney, Agent, or Firm*—Longacre & White

[57] ABSTRACT

A clutch diaphragm, especially for a motor vehicle clutch, comprises a peripheral portion defining a Belleville ring, and a central portion which is divided into radial fingers by radial slots, each terminating in an aperture in the vicinity of the root zone of the radial fingers. Local dimples are formed in the Belleville ring portion of the diaphragm, each in register with a corresponding one of the apertures so as to reduce the peaking effect of the characteristic curve of the diaphragm.

13 Claims, 5 Drawing Sheets

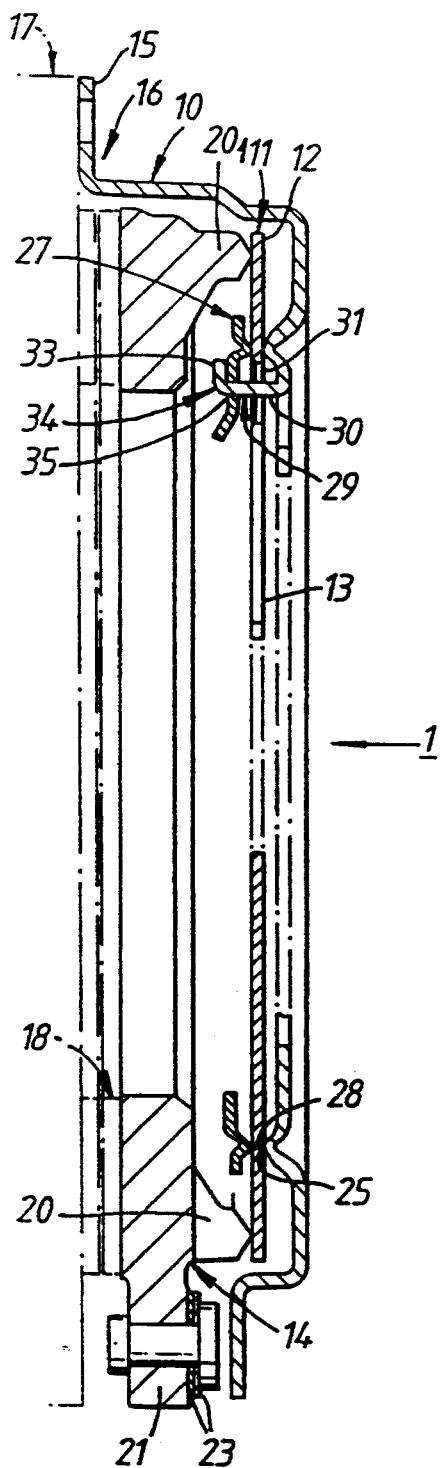
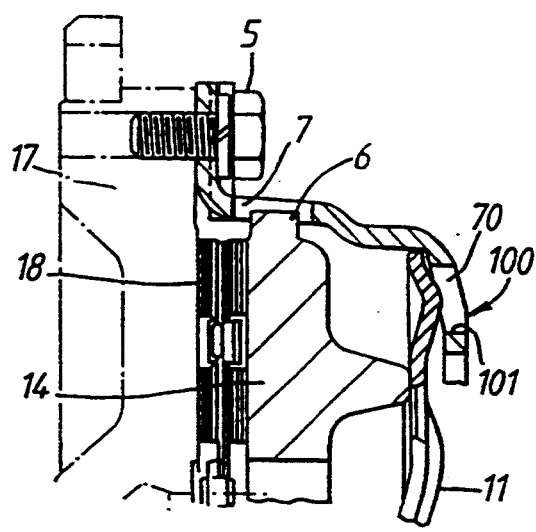
Fig.7
Fig.2
(PRIOR ART)

CLUTCH DIAPHRAGM, IN PARTICULAR FOR A MOTOR VEHICLE

FIELD OF THE INVENTION

The present invention relates to diaphragms of the kind constituting one of the essential components of a clutch diaphragm, in particular for a motor vehicle.

BACKGROUND OF THE INVENTION

Such a diaphragm, annular in shape, is described for example in the specification of published French Patent Application FR2244101A and the corresponding United Kingdom Patent Specification No. 1438310. It comprises a peripheral portion which defines a Belleville ring, and a central portion which is divided into radial fingers by slots. In its relaxed state the general shape of the whole is frustoconical. The peripheral portion of the diaphragm constitutes an axially acting resilient means which, when installed in a clutch, is engaged on a cover plate of the clutch and bears on a pressure plate of the clutch, in such a way that the latter is continuously biased into engagement such that at least one friction wheel or clutch plate of the clutch is gripped. The radial fingers of the central portion of the diaphragm act as declutching levers which, under the action of a clutch release bearing, are adapted to cause the pressure plate to be released by the Belleville ring portion of the diaphragm, so that the pressure plate is then itself released.

In the vicinity of the root of the radial fingers, and alternating with the latter, the diaphragm is formed with apertures, each of which is open radially into a respective one of the slots by which the radial fingers are separated from each other. In the context of clutches of the kind known as push-off clutches, some of these apertures are used as passages through which lugs, spacer bars or the like pass. These lugs, spacer bars or the like form at least part of a pivoting connection between the diaphragm and the cover plate of the clutch.

One difficulty encountered in the design of the diaphragm results from the fact that in service, during a declutching operation, the radial fingers of its central portion are not bent through an inclination the same as that found in its peripheral portion. In practice, the bending inclination of the radial fingers is greater than that in the peripheral portion. As a result, for a given displacement of the clutch release bearing, the clutch is released by an amount which is less than the amount by which the pressure plate is released. In addition, there is a possibility of undesirable wrinkling occurring in the diaphragm, and more precisely in its Belleville ring portion, such as to cause fracture of the diaphragm.

In addition, as is described in the specification of French published Patent Application FR2563877A, a diaphragm has a characteristic curve having a peaked shape, in which the diaphragm force increases firstly as the deformation of the diaphragm increases, and then passes through a maximum before decreasing again. The elastic characteristic of the diaphragm is determined by the ratio h/s (where h is the height of the frustum of a cone defined by the Belleville ring, measured parallel to the axis, and s is the thickness of the diaphragm).

For this reason, in the last mentioned document, an arrangement is provided in which the Belleville ring is formed with an inward curvature so as to reduce the peaking effect of the characteristic curve of the diaphragm. However, such an arrangement is not entirely satisfactory, because firstly, it does not lead to good control of the force exerted by the diaphragm, and secondly, it stiffens the peripheral portion of the diaphragm in such a way that the bending of the fingers is even more pronounced.

DISCUSSION OF THE INVENTION

An object of the present invention is to overcome these drawbacks in a simple and inexpensive way, by providing a novel arrangement in which the peaking effect of the characteristic curve of the diaphragm is reduced, while at the same time the displacement of the pressure plate is improved.

According to the invention, a diaphragm for a diaphragm type clutch, especially for motor vehicles, of the kind comprising a peripheral portion defining a Belleville ring, together with a central portion divided into radial fingers by slots and apertures in the vicinity of the root of the said radial fingers and alternating with the latter, with each of the said apertures being open radially inwardly into a corresponding one of the slots separating each radial finger from the next, is characterised in that its peripheral portion has local, axially projecting, anti-peaking deformations in line with at least some of its said apertures.

Thanks to the invention, the stiffness of the peripheral portion of the diaphragm is reduced, while at the same time the bending of the fingers of the diaphragm is reduced, and the displacement of the pressure plate is increased. Improved control of the force exerted by the diaphragm is also obtained. In addition, peaking of the characteristic curve of the diaphragm is reduced, and this leads to increased comfort for the driver of the vehicle. The invention also enables stiffening of the fingers of the diaphragm to be readily improved. In this connection, as in the above mentioned French Patent Specification FR2244101A, radial stiffening ribs may be provided on the radial fingers of the diaphragm. According to a preferred feature of the invention, these ribs are associated with separate stiffening deformations formed in the peripheral portion of the diaphragm which constitutes the Belleville ring. These deformations extend the stiffening effect of the ribs on the fingers. Such an arrangement is easy to put into practice, and does not unduly interfere with the load characteristics of the diaphragm.

In addition, and contrary to what is stated in French Patent specification FR2549919A, there is no need to make any special arrangements in order to permit the diaphragm to pivot when it is part of a clutch of the push off type. In this connection none of the deformations formed in the Belleville ring forms part of the radially innermost portion of the latter, i.e. there is a continuous uninterrupted and substantially flat annular zone between the apertures and the various deformations, so that arrangements that are conventional in push-off type clutches, for permitting pivoting of the diaphragm, can be retained.

In addition, in the context of a clutch of the pull-off type, the stiffening deformations in the Belleville ring can enable the diaphragm to be prevented from rotating by cooperation with abutments formed in the cover plate of the clutch.

In a modification, these deformations, when they are directed towards the pressure plate of the clutch, can facilitate the tilting of the diaphragm.

The description, of preferred embodiments of the invention which follows is given by way of example only and with reference to the accompanying drawings.

BRIEF DESCRIPTION OF THE DRAWINGS

FIG. 2 is a view in axial cross section taken on the broken line 2—2 in FIG. 1.

FIG. 7 is a scrap view similar to part of FIG. 3, but showing a modified arrangement in accordance with the invention.

DESCRIPTION OF PREFERRED EMBODIMENTS OF THE INVENTION

Figure 4:
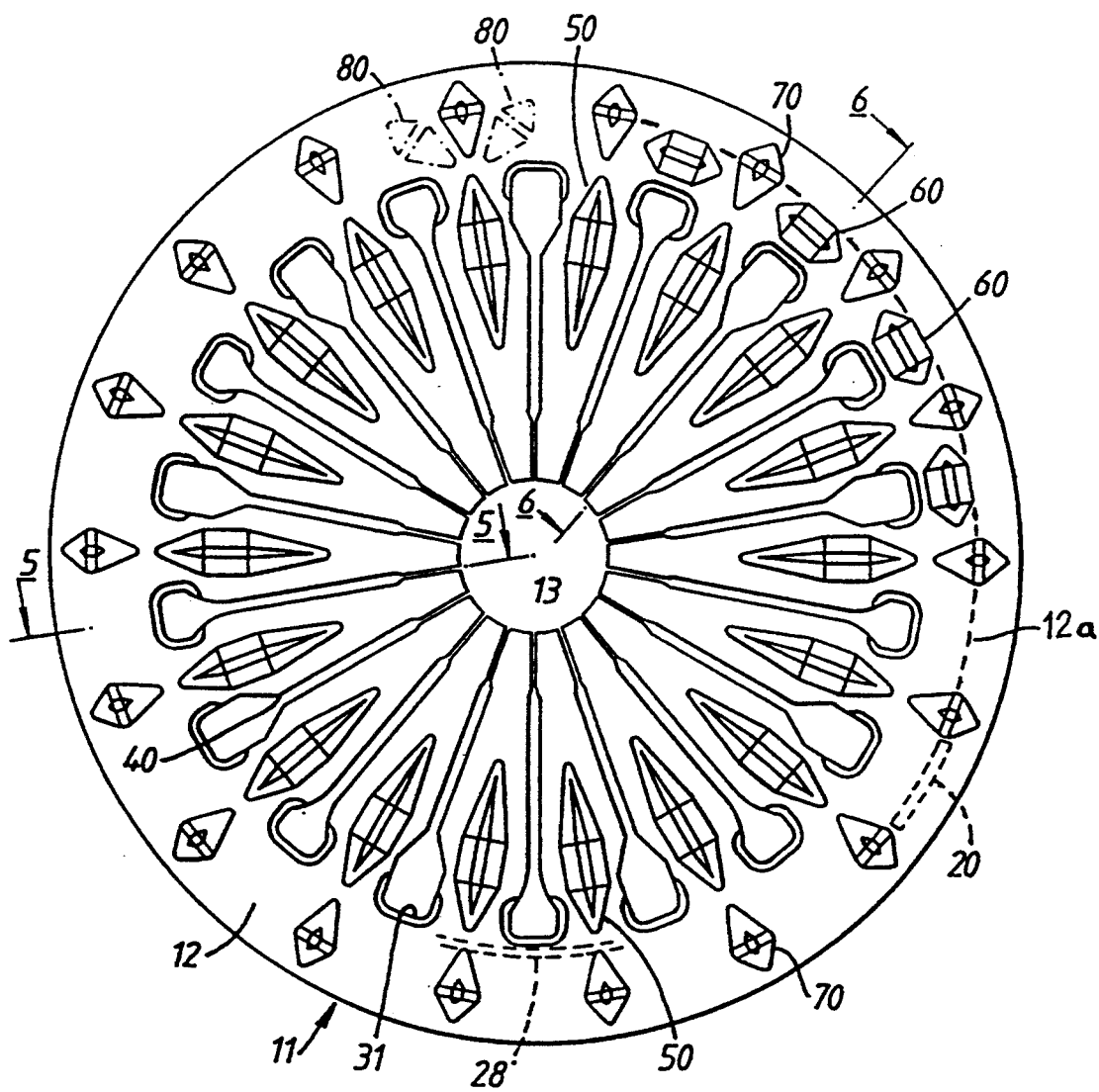
FIG. 4 is a view in elevation of a diaphragm in accordance with the present invention.
Figure 5:
FIG. 5 is a view in cross section taken on the line 5-5 in FIG. 4.

Reference is first made to FIG. 4, which shows a diaphragm 11 according to the invention. This is one of the essential components of a diaphragm clutch, in particular for a motor vehicle. This clutch may be of the push-off type in which a thrust is exerted on the diaphragm in order to disengage the clutch, or of the pull-off type in which a force is exerted in traction on the diaphragm to disengage the clutch.

Figure 1:
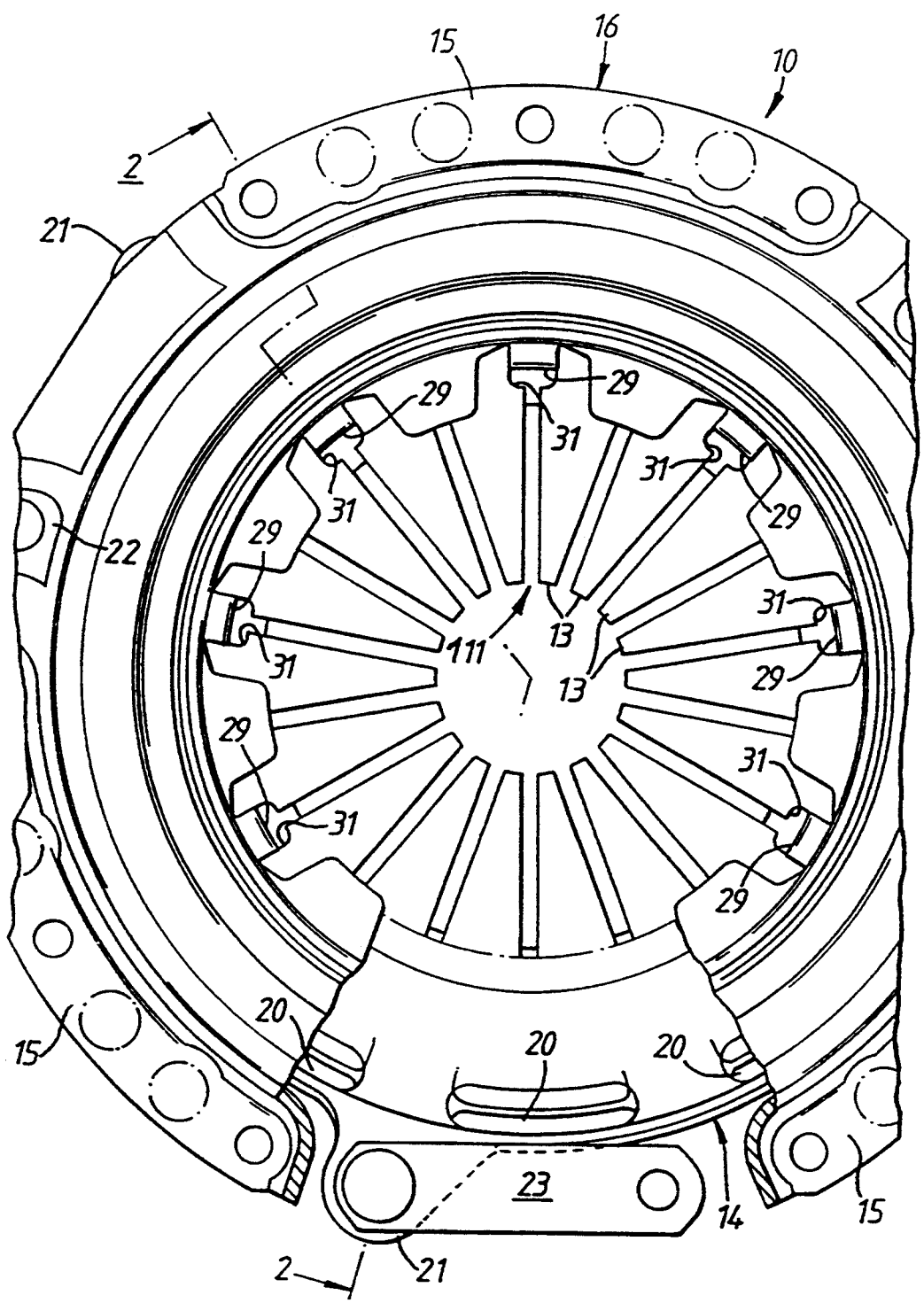
FIG. 1 is a view in elevation, seen in the direction of the arrow 1 in FIG. 2, showing part of a diaphragm clutch mechanism of the push-off type in the prior art, with certain parts cut away.
Figure 3:
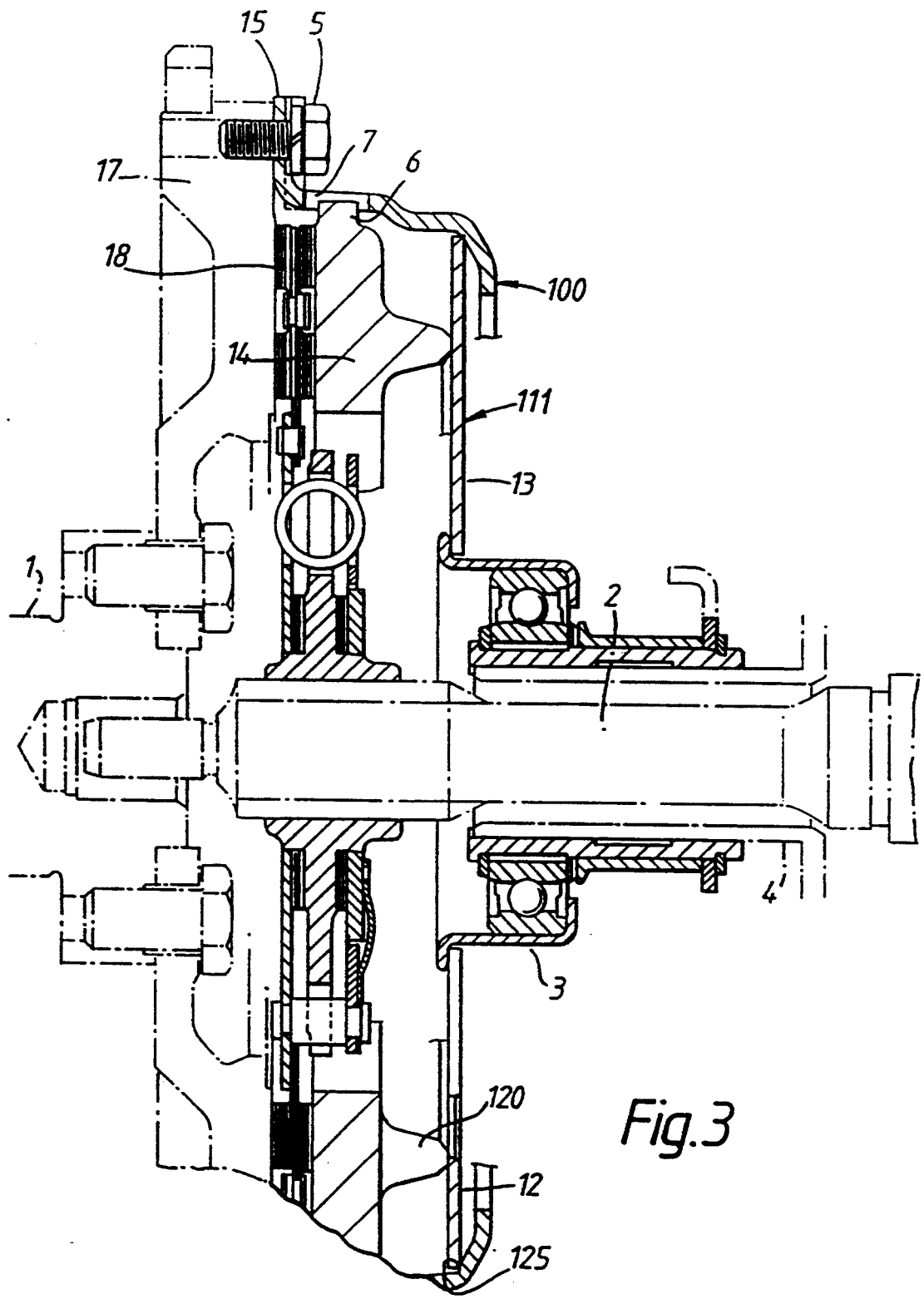
FIG. 3 is a view similar to FIG. 2, but shows a diaphragm clutch mechanism of the pull-off type from the prior art.

Such clutch mechanisms are shown in a form currently known in FIGS. 1 to 3, to which reference is now made. In these figures, the clutch includes a diaphragm 111 which is frustoconical in shape when in its free state. It is formed to shape and heat treated in order to obtain the hardness and elasticity required.

The clutch includes a clutch mechanism forming a unitary assembly. Such a mechanism comprises an assembly of annular members, namely a cover plate 10 (FIGS. 1 and 2) or 100 (FIG. 3), at least one pressure plate 14, the diaphragm 111. The diaphragm has a peripheral portion 12 defining a Belleville ring together with a central portion which is divided into radial fingers 13. The central position is joined to the portion 12 by a circumferential root zone defining the roots of the fingers 13.

The cover plate 10 or 100 is adapted to be attached, usually by means of screws 5 shown in FIG. 3 secured through fastening portions 15 of a peripheral radial flange 16 of the cover plate, on the reaction plate 17 or fly-wheel which is shown diagrammatically by phantom lines in FIG. 2. The reaction plate 17 is fixed on a driving shaft 1, which in the context of a motor vehicle is the crankshaft of the internal combustion engine of the vehicle.

A clutch friction disc 18 is inserted between the pressure plate 14 and reaction plate 17, and is secured in rotation to a driven shaft 2, which in the context of a motor vehicle is the input shaft of the gearbox of the vehicle.

The pressure plate 14 is secured in rotation to the cover plate 10 or 100, but is mounted so that it can move axially with respect to the latter. In current practice the pressure plate 14 may be secured to the cover plate typically by means of tangential tongues 23 (FIG. 1), or tenons 6 co-operating with mortices 7 as shown in FIG. 3.

Thus in the arrangement shown in FIG. 1, the pressure plate 14 has a series of lugs 21 projecting radially at intervals. The resilient tongues 23 extends substantially tangentially to a circumference of the assembly, between the lugs 21 and connecting zones 22 of the peripheral flange 16 of the cover plate. The tongues 23 secure the pressure plate 14 to the cover plate 10 for rotation together, while still permitting relative axial displacement. The most common way of securing the tongues 23 to the lugs 21 and connecting zones 22 is by riveting. In the arrangement shown in FIG. 3, the pressure plate 14 carries the radially projecting tenons 6, which are disposed at intervals around its circumference and engaged in the mortices 7, which are formed in the peripheral annular skirt of the cover plate 100.

The pressure plate 14 also has a set of axial bosses 20 (FIGS. 1 and 2) or 120 (FIG. 3) for acting on the diaphragm 111. The Belleville ring portion 12 of the latter bears on these bosses.

The cover plate 10 in FIGS. 1 and 2 has a first or primary contact means 25 for contact with the peripheral portion 12 of the diaphragm 111. More precisely, the peripheral portion of the Belleville ring 12 of the diaphragm engages on the bosses 20 of the pressure plate 14, while the inner portion of the Belleville ring 12 engages on the primary contact element 25 of the cover plate 10. In this example, this consists of a deformation of the cover plate, formed in a half-wave shape by a pressing operation and constituting a first contact ring.

In FIGS. 1 and 2, the diaphragm 111 is pivotally attached to the cover plate 10 by assembly means comprising an annular member 27 (referred to as a crown ring), on the side of the diaphragm 11 opposite to the cover plate 10. The crown ring 27 serves as a second contact element, or secondary contact element, for engagement with the diaphragm 111; and in the embodiment shown it has, for this purpose, a deformation 28, having a cross section in the form of a half-wave which is similar to, and aligned with, the half-wave deformation 25 of the cover plate 10.

Besides the crown ring 27, the above-mentioned assembly means also include a set of relatively thin, flat retaining lugs 29. These are fixed with respect to either the cover plate 10 or the crown ring 27, or they may bear axially on either of these two components. Each retaining lug 29 has an axially extending straight portion 30, which passes firstly through the diaphragm 111, via apertures 31 formed in the latter at the root zone of the radial fingers 13 in the embodiment shown, and secondly, through whichever of the components comprising the crown ring 27 and cover plate 10 is not the one to which the lugs 29 are fixed. Beyond this other component 27 or 10, each retaining lug 22 has at its free end 33 a locating bend 34 which bears axially on that component 27 or 10. To form the locating bend 34, the free end 33 is bent radially outwards away from the axis of the assembly.

In the particular arrangement shown in FIG. 2, it is the cover plate 10 to which the retaining lugs 29 are fixed, these lugs being in fact integral with the cover plate and formed by an appropriate pressing and bending operation of the blank from which the cover plate 10 is formed. The retaining lugs 29 are thus here part of the cover plate 10. Accordingly, it is the crown ring 27 through which the straight portions 30 of the lugs 29 pass, and on which their locating bends 34 are engaged. The crown ring 27 has holes 35 through which the retaining lugs 29 pass.

In a modified embodiment, the crown ring 27 may be frustoconical in shape and without the holes 35, the crown ring being then centred by the retaining lugs 29 at its inner periphery. Its outer periphery then has a rounded edge defining the secondary contact element 28.

In a further modification, the assembly means mentioned above (which in FIGS. 1 and 2 comprise the crown ring 27 and retaining lugs 29) may consist of a set of bars and rings in the manner described in the specification of French published patent application FR 2244101A.

The corresponding arrangement in the pull-off type of mechanism shown in FIG. 3 is that the diaphragm 111 bears, through the outer peripheral portion of its Belleville ring 12, on the primary contact element of the cover plate 100, which here consists of a bead element 125 formed by pressing. The radially inner part of the Belleville ring 12 of the diaphragm 11 bears on the bosses 120 of the pressure plate 14.

In either the pull-off or push-off mechanism, and indeed in all cases, the diaphragm 111 bears on the cover plate 10 or 100, so as to act on the pressure plate 14 and grip the clutch friction plate 18 (and more precisely the friction liner as conventionally carried by the latter) between the pressure plate 14 and the reaction plate 17. In order to disengage the clutch, the inner end of the fingers 13 of the diaphragm are engaged by a clutch release bearing. This latter is shown at 3 in FIG. 3: it slides axially along a guide tube 4 which is fixed to the gearbox of the vehicle.

In the mechanism shown in FIG. 3, the clutch release bearing acts in traction on the inner ends of the fingers 13, and is configured for this purpose so as to include a member which passes through the central aperture in the diaphragm. This member acts on the fingers 13 on the side of the diaphragm which faces towards the reaction plate 17. In the type of mechanism shown in FIG. 2, the clutch release bearing acts in a thrust mode on the ends of the fingers 13, so as to cause the diaphragm to pivot between its primary contact element 25 and secondary contact element 28.

Thus, whether in a push-off or a pull-off mode, the diaphragm 111 is caused to tilt, and the normal elastic action exerted by the Belleville ring 12 on the pressure plate 14 is removed. In this way the clutch friction wheel 18 becomes free.

Referring now to FIG. 4 showing a diaphragm according to the present invention,, the apertures 31 are generally rectangular in shape, with radiused corners so as to reduce local stresses. The fingers 13 of the diaphragm are separated by radial slots 40, each of a buttonhole shape. The inner end of each slot 40 is extended by a slot of reduced width which opens into the central aperture of the diaphragm. Thus the apertures 31 form the blind, radially outer, ends of the slots 40, but are wider than the latter. In a modification, not shown, the apertures 31 may be circular, and the slots 40 may be of constant width. Some of the apertures 31, i.e. those through which retaining lugs 29 (FIG. 2) do not pass, may have a reduced radial depth, as shown, so as to increase the rigidity of the fingers 13.

Figure 6:
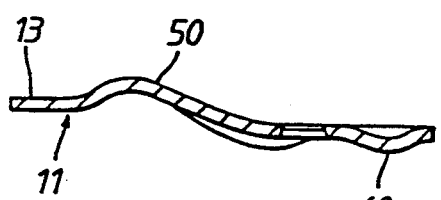
FIG. 6 is a view in cross section taken on the line 6—6 in FIG. 5.

A set of anti-peaking deformations in the form of dimples 60 are formed locally in radial alignment with at least some of the apertures 31, in the peripheral portion 12 of the diaphragm 11 in FIG. 4. As can be seen in FIG. 6, these dimples 60 project axially from the diaphragm. In the interests of simplicity, FIG. 4 shows the dimples 60 in only one quarter of the diaphragm, but it will be understood that there is in fact, here, one dimple 60 associated with each aperture 31. However, this is not necessarily true, and there may for example be only one dimple 60 associated with every other aperture 31.

The dimples 60 in this example do not form part of the radially inner-most portion of the Belleville ring portion 12, so that (as shown in FIG. 4 in broken lines), the secondary contact element 28 of the crown ring 27 can engage on the Belleville ring 12 without interfering with the dimples 60.

The dimples 60 are oblong in shape and are made by pressing. They reduce the peaking of the characteristic curve of the diaphragm explained earlier herein, and as shown in FIG. 4, they extend in a generally circumferential direction, being spaced radially outward of the associated apertures 31. In this particular example, the dimples 60 extend mainly within the neutral line 12a of the Belleville ring portion 12. Each dimple 60 is in facing relationship with the outer or base edge of the corresponding apertures 31.

The dimples 60 enable stiffening ribs 50 to be formed in the fingers 13 of the diaphragm. The stiffening effect of these stiffening ribs 50 is extended radially by further deformations in the form of local stiffening elements 70. These stiffening elements 70, like the dimples 60, do not extend to the inner periphery of the Belleville ring portion 12, so that they do not interfere with the secondary contact element 28 (FIG. 2). The local stiffening elements 70 are however oriented radially in the peripheral portion 12 of the diaphragm. Consequently, as shown in FIG. 1, the bosses 20 of the pressure plate 14 are made discontinuous so that they comprise separate elements, each interposed between two consecutive stiffening elements 70.

In a modification indicated in FIG. 4 in broken lines, the stiffening ribs 50 are associated with further local stiffening deformations 80 in the peripheral portion 12 of the diaphragm, these deformations 80 being inclined on either side of the radial axis of symmetry of the stiffening ribs 50.

Preferably, all of the deformations 60, 70, 80, and the stiffening ribs 50, are made by a suitable pressing operation stretching the material of the diaphragm and forming axial projections. Thus, referring to FIG. 8, this shows press tool elements 91 and 92. The tool elements 90 are associated with the stiffening ribs 50, while the tool elements 91 are associated with the stiffening elements 70. The tool elements 92 are associated with the anti-peaking dimples 60.

The method of manufacture is easy to carry out in a press, using tooling which comprises the tool elements 90, 91 and 92 together with a die 94 and a carrier 93 for carrying the tool elements 90, 91 and 92. The tool elements are of constant width, each one comprises a central portion, with inclined portions, as shown, on either side of central portion.

It will be appreciated that with the arrangement described above, the thickness of the diaphragm has no need to be increased and this simplifies manufacture. Accordingly, in a first stage of forming the diaphragm, the fingers 13 and apertures 31 of the latter are cut out, and the ribs 50 and deformations 60 and 70 are pressed out. The diaphragm is subsequently given its conical shape, and is then heat treated.

Figure 8:
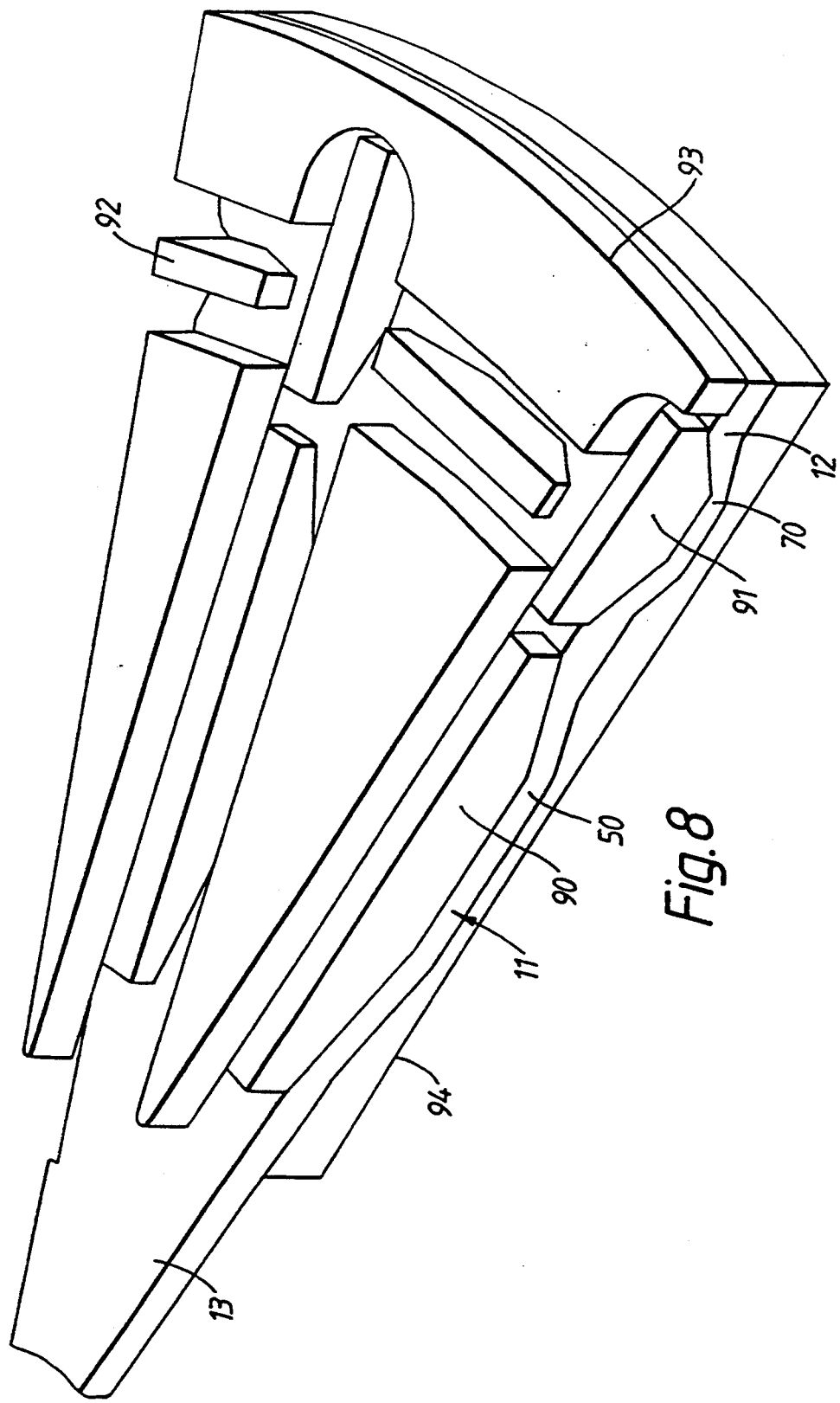
FIG. 8 is a perspective view showing part of the manufacturing tool for making deformations and ribs in a diaphragm according to the invention.

The tool elements shown in FIG. 8 give the shapes shown in FIG. 4 for the stiffening ribs 50 and the dimples 60 and stiffening elements 70. Thus each of the elements 50, 60 and 70 is generally lozenge shaped as shown in FIG. 4. In the stiffening elements 70 and the stiffening ribs 50, one of the pointed sections is longer than the other, while in the anti-peaking dimples 60, the pointed sections are symmetrical with each other. The inclined portions of the tool elements 90 to 92 are of course designed accordingly.

In each of the stiffening ribs 50, the smaller one of its pointed sections, i.e. the one furthest away from the axis of the diaphragm, lies between two apertures 31, so that stresses in the region of the latter are not unduly increased. The other pointed section of each stiffening rib 50, i.e. the longer pointed section, saves a maximum amount of material for the fingers 13. The central section of these ribs lies generally at the same radius as the junction of the apertures 31 with the slots 40.

In the context of a clutch of the pull-off type, the local stiffening elements 70 preferably prevent rotation of the diaphragm 11. In this connection, these elements 70 extend to the outer periphery of the Belleville ring portion, so that the central section of the elements 70 can co-operate with, for example, a slot 101 formed in the base of the cover member 100. This arrangement is shown in FIG. 7. To this end, the stiffening element 70 penetrates into the slot 101 with a clearance. Then, in the event of rotation of the diaphragm, the diaphragm automatically engages, through its deformations 70, against the profile which defines the slots 101.

In a clutch of the push-off type, all of the axially projecting deformations 60 and 70, and the stiffening ribs 50, are preferably directed axially towards the pressure plate 14 and reaction plate 17 of the clutch; though it is of course possible to reverse this arrangement. Thus in FIG. 7, the direction in which the stiffening element 70 projects can be reversed, and a good tilting action of the diaphragm 11 is then obtained.

The anti-peaking deformations or dimples 60 are oriented circumferentially, that is to say generally at right angles to the stiffening deformations or elements 70 and to the stiffening ribs 50. The length of each dimple 60 is generally equal to the width of the corresponding aperture 31.

It will be noted that the pointed ends of the dimples 60 avoid any increase in stresses in the region of the apertures 31, and particularly in the region of the corners of the latter, since the fact that these ends are pointed enables a clear space to be left between them and the corners of the apertures. It will also be noted that the longer one of the two pointed sections of each local stiffening element 70 is directed towards the axis of the diaphragm, that is to say towards the less sharply pointed end section of the associated stiffening rib 50.

All these various shapes tend to reduce stresses in the peripheral portion 12 of the diaphragm, while at the same time providing stiffening for the fingers of the diaphragm and preventing the occurrence of peaks or creases in the characteristic curve of the latter. In addition, good control of the load on the diaphragm is obtained.

It will be appreciated that the anti-peaking deformations 60 do not unduly affect the root zone joining the fingers 13 to the Belleville ring 12.

The deformations 80 are of course also obtained by pressing, and have an asymmetrical shape like the local stiffening element 70.

The anti-peaking deformations 60 can of course extend radially by a greater amount towards the outer periphery of the ring 12, or, in a modification, they may be closer to the apertures 31. This leads to modification of the assembly means by which the diaphragm is pivotally attached to the cover plate.

What is claimed is:

1. A clutch diaphragm comprising a peripheral portion defining a Belleville ring, a central portion, and a circumferential root zone joining the central portion to the peripheral portion, the central portion being divided into radial fingers defining between them a corresponding number of radial slots and apertures, the apertures being in the vicinity of the said root zone of the fingers, with each aperture being open radially inwardly into a corresponding said slot, said peripheral portion defines a plurality of local anti-peaking deformations projecting axially and disposed in radial alignment with at least some of the said apertures, wherein the anti-peaking deformations are oblong in shape and extend generally circumferentially, and are spaced away from the corresponding said apertures, and wherein the peripheral portion defines a neutral line radially inside a radially outermost periphery of said peripheral portion, the anti-peaking deformations being formed mainly radially inward of the neutral line.

2. A diaphragm according to claim 1, wherein each anti-peaking deformation has a circumferential length substantially equal to the circumferential width of the associated said aperture.

3. A clutch diaphragm comprising a peripheral portion defining a Belleville ring, a central portion, and a circumferential root zone joining the central portion to the peripheral portion, the central portion being divided into radial fingers defining between them a corresponding number of radial slots and apertures, the apertures being in the vicinity of the said root zone of the fingers, with each aperture being open radially inwardly into a corresponding said slot, said peripheral portion defines a plurality of local anti-peaking deformations projecting axially and disposed in radial alignment with at least some of the said apertures, wherein each of said fingers defines a stiffening rib, the peripheral portion of the diaphragm further defining local stiffening deformations disposed radially outward of the said stiffening ribs.

4. A diaphragm according to claim 3, wherein each of at least some of the elements comprising the said stiffening ribs, anti-peaking deformations, and stiffening deformations, has a configuration defining two pointed sections joined together by a widened central section.

5. A diaphragm according to claim 4, wherein, in each element in the group comprising the stiffening deformations and stiffening ribs having a said configuration, the pointed sections are asymmetrical.

6. A diaphragm according to claim 5, wherein the pointed sections of each said anti-peaking deformation having a said configuration are symmetrical.

7. The diaphragm according to claim 3, wherein each of at least some of the elements comprising the anti-peaking deformations and stiffening deformations has a configuration defining two pointed sections joined together by a widened central section.

8. The diaphragm according to claim 7, wherein the pointed sections of the stiffening deformations are asymmetrical.

9. A clutch diaphragm comprising a peripheral portion defining a Belleville ring, a central portion, and a circumferential root zone joining the central portion to the peripheral portion, the central portion being divided into radial fingers defining between them a corresponding number of radial slots and apertures, the apertures being in the vicinity of the said root zone of the fingers, with each aperture being open radially inwardly into a corresponding said slot, said peripheral portion defines a plurality of local anti-peaking deformations projecting axially and disposed in radial alignment with at least some of the said apertures, wherein each of said fingers has a stiffening rib defining a radial axis of symmetry, the peripheral portion of the diaphragm further defining pairs of local stiffening deformations associated with at least some of the said stiffening ribs, the local stiffening deformations of each pair being inclined on either side of the radial axis of symmetry of the associated stiffening rib.

10. A clutch diaphragm comprising a peripheral portion defining a Belleville ring, a central portion, and a circumferential root zone joining the central portion to the peripheral portion, the central portion being divided into radial fingers defining between them a corresponding number of radial slots and apertures, the apertures being in the vicinity of the said root zone of the fingers, with each aperture being open radially inwardly into a corresponding said slot, said peripheral portion defines a plurality of local anti-peaking deformations projecting axially and disposed in radial alignment with at least some of the said apertures, wherein the anti-peaking deformations are oblong in shape and extend generally circumferentially, and are spaced away from the corresponding said apertures, and wherein the anti-peaking deformations have a configuration defining two pointed sections joined together by a widened central portion.

11. The diaphragm according to claim 10, wherein the pointed sections of said deformations are symmetrical.

12. The diaphragm according to claim 10, wherein each of said fingers defines a stiffening rib, said stiffening rib having a configuration defining two rib pointed sections joined together by a rib widened central section.

13. The diaphragm according to claim 12, wherein the two rib pointed sections are asymmetrical.

* * * * *